(12) United States Patent
Bartos et al.

(10) Patent No.: US 7,325,845 B2
(45) Date of Patent: Feb. 5, 2008

(54) SPRING LOADED LOCK AND LATCH WITH AUTOMATIC RESET CAPABILITY

(75) Inventors: Andrew L. Bartos, Clarkston, MI (US); Teresa U. Holiness, Detroit, MI (US); Robin Stevenson, Bloomfield, MI (US); Devadatta M. Kulkarni, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 243 days.

(21) Appl. No.: 11/028,912

(22) Filed: Jan. 4, 2005

(65) Prior Publication Data

US 2006/0145498 A1    Jul. 6, 2006

(51) Int. Cl.
  *E05B 63/20* (2006.01)
(52) U.S. Cl. .......................................... 292/332; 70/143
(58) Field of Classification Search ................. 292/332, 292/335; 70/143
  See application file for complete search history.

(56) References Cited

U.S. PATENT DOCUMENTS

| 1,198,862 A | * | 9/1916 | McCormack | 292/332 |
| 1,570,135 A | * | 1/1926 | Emmert | 292/334 |
| 2,566,284 A | * | 8/1951 | Eichacker | 292/332 |
| 5,104,163 A | * | 4/1992 | Palmer et al. | 292/335 |

* cited by examiner

Primary Examiner—Gary Estremsky

(57) ABSTRACT

A latch assembly includes a plunger having a ramp and a lip, with a support member defining an opening through which the plunger extends. A support surface partially defines the opening and supports the plunger. The plunger is selectively movable between an extended position, in which the plunger protrudes a first distance from the opening, and a retracted position, in which the plunger protrudes a second distance from the opening, with the second distance being less than the first distance. In the extended position, the ramp and the lip are on a first side of the opening. In contrast, in the retracted position, the ramp and the lip are on a second side of the opening, with the lip engaging the support member to maintain the retracted position.

12 Claims, 3 Drawing Sheets

SPRING LOADED LOCK AND LATCH WITH AUTOMATIC RESET CAPABILITY

TECHNICAL FIELD

The present invention relates to roll-out load floors for automotive vehicles and, more particularly, to a locking mechanism for securely maintaining a sliding load floor in a desired position.

BACKGROUND OF THE INVENTION

Typical roll-out load floors slide along a track between a rearward extended position for loading and unloading, and a forward stowed position for load transport. A locking mechanism maintains the load floor in the stowed position or the extended position, or in another position relative to the track. A typical locking mechanism includes a latch member fixed to one of either the load floor or the track, and a plurality of detent members fixed to the other of the load floor or the track. When the latch member engages one of the detent members, the load floor is in a locked condition with respect to the track. To unlock the load floor, an operator typically disengages the latch member from the detent member, thereby allowing the load floor to slide along the track.

SUMMARY OF THE INVENTION

A latch assembly is provided. The latch assembly includes a plunger defining a ramp and a lip, a spring, and a support member defining an opening through which the plunger extends. The spring biases the plunger toward an extended position in which the plunger protrudes a first distance from the opening. The plunger is selectively movable from the extended position to a retracted position in which the plunger protrudes a second distance from the opening, the second distance being less than the first distance, and in which the lip engages the support member to counteract the spring and thereby maintain the plunger in the retracted position.

The latch assembly may be used to selectively lock a movable member with respect to a stationary member. In the extended position, the plunger is engageable with a slot in a stop member to prevent or restrict relative movement between the movable and the stationary members. In the retracted position, the plunger is not engageable with the slot, and, accordingly, does not interfere with relative movement between the stationary member and the movable member.

The latch assembly of the invention enables positive disengagement of the plunger from a slot, i.e., once an operator retracts the plunger, the plunger remains in the retracted position without continued operator effort. The latch assembly of the invention also enables automatic resetting of the plunger to the extended position so that it will automatically engage a slot without operator effort or intervention when appropriately aligned with respect to the stop member.

Accordingly, an apparatus is provided having a first member, a second member selectively movable between a first position and a second position with respect to the first member, a stop member connected to one of the first and second members, and a latch assembly connected to the other of the first and second members. The stop member defines a slot and a ramp. The latch assembly includes a plunger defining a ramp and a lip, a spring, and a support member defining an opening through which the plunger extends. The spring biases the plunger toward an extended position in which the plunger protrudes a first distance from the opening sufficient for the plunger to engage the slot when the second member is in the first position to prevent or restrict relative movement between the first and second members.

The plunger is selectively movable from the extended position to a retracted position in which the plunger does not engage the slot, and in which the lip engages the support member to counteract the spring and thereby maintain the plunger in the retracted position. Thus, when the plunger is in the retracted position, the second member is movable to the second position.

The stop member includes a geometrical feature, such as a ramp, that is sufficiently positioned to contact the plunger during movement of the second member from the first position to the second position, and thereby cause the lip to disengage the support member so that the spring moves the plunger to the extended position. The plunger is thus automatically reset to engage another slot when the second member is in the second position.

In an exemplary embodiment, the first member is a track, and the second member is a vehicle cargo load floor translatable along the track between a stowed position and an extended position. Accordingly, a load floor operator need only move the plunger to the retracted position to move the load floor from the stowed position. The latch assembly will automatically engage another stop when the load floor is in the extended position without operator effort, thereby reducing or eliminating the possibility of load floor over-extension beyond the extended position.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
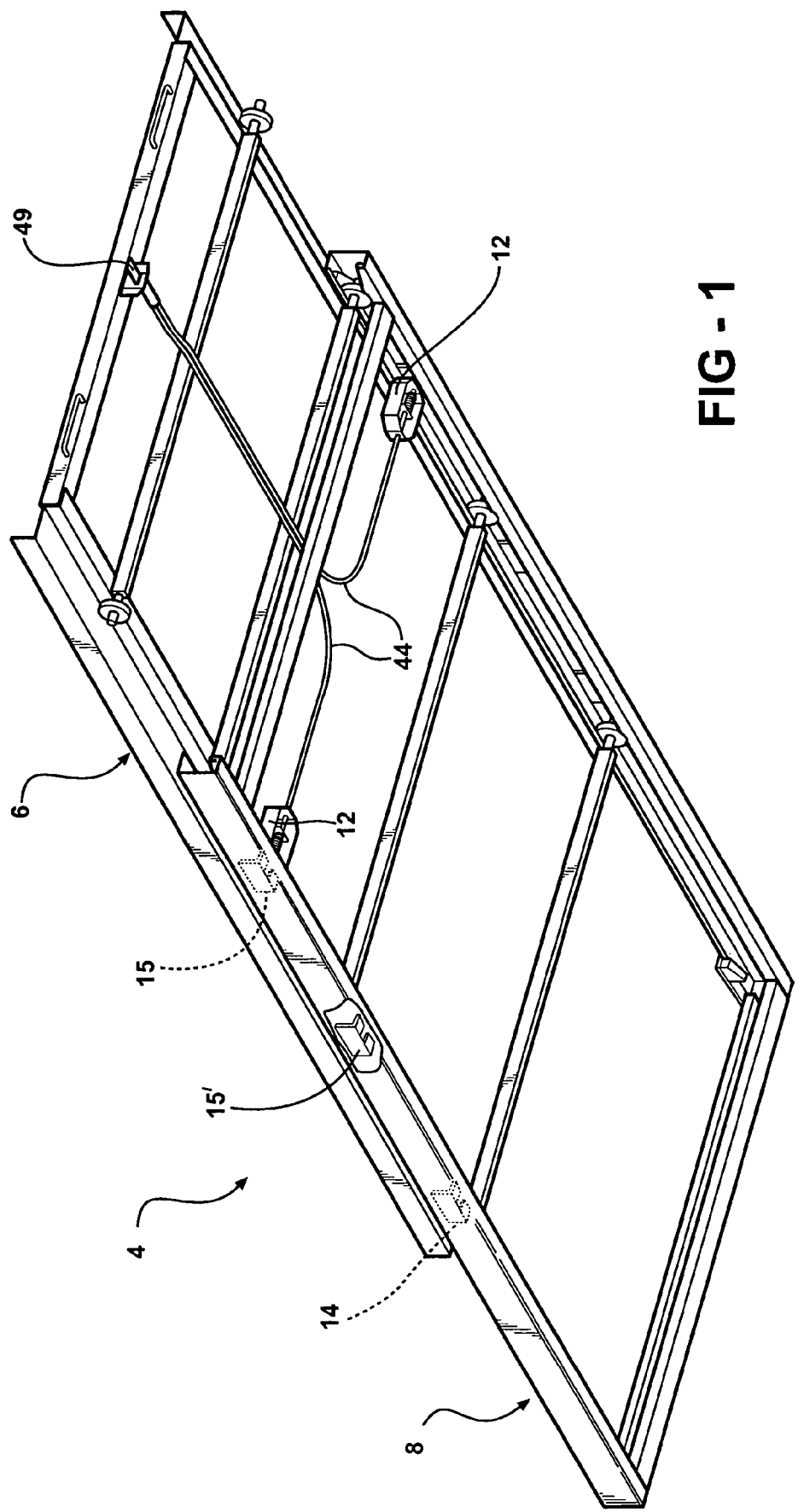
FIG. 1 is a schematic perspective view of a sliding load floor incorporating a locking mechanism according to the present invention.

Referring to FIG. 1, a sliding load floor assembly incorporating a locking mechanism 10 according to the present invention is shown at 4. The sliding load floor assembly 4 includes a sliding member 6 for receiving a load floor slidable along a track 8. Each side of the sliding load floor assembly 4 includes a locking mechanism, shown at 10 in FIGS. 2-5, comprising at least one latch assembly 12 and first and second stop members 14, 15, also referred to herein as "detent members." For ease of description, it will be assumed throughout that the detent members 14, 15 attach to a stationary member such as the track 8 or a vehicle floor, while the latch assembly 12 attaches to a movable member such as the sliding platform 6. However, it should be appreciated that the detent members 14, 15 could attach to the movable member and the latch assembly 12 to the stationary member without changing the inventive concept.

An exemplary load floor assembly with which the locking mechanism may be employed is described in commonly assigned U.S. patent application Ser. No. 11/007,871 filed Dec. 9, 2004, entitled "Sliding Vehicle Load Floor," Bartos et al., and hereby incorporated by reference in its entirety.

Figure 2:
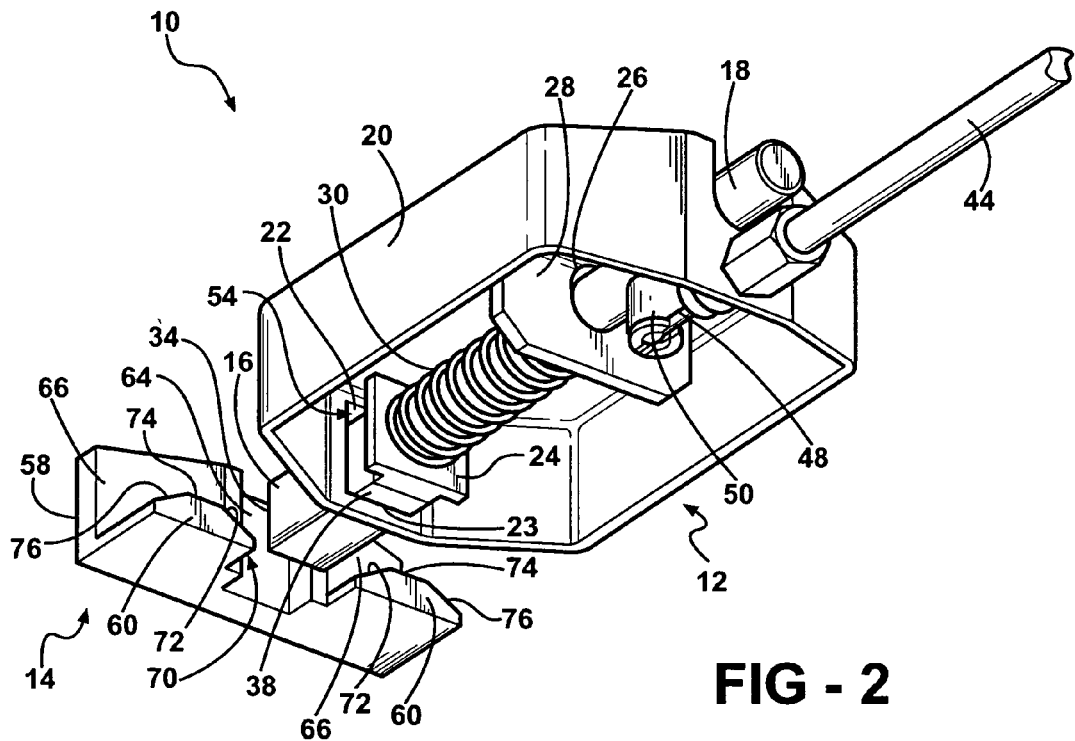
FIG. 2 is a schematic perspective view of a latch assembly and a detent member of the locking mechanism of FIG. 1.
Figure 3:
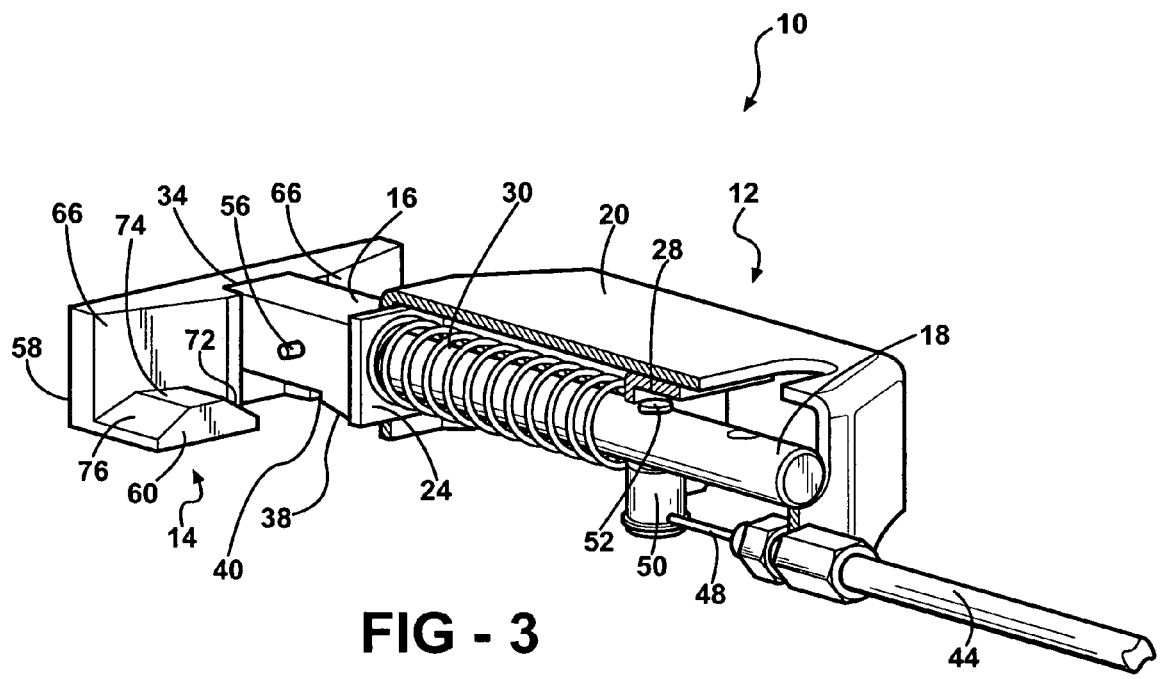
FIG. 3 is a schematic, partial cutaway, perspective view of the latch assembly and the detent member of FIG. 2.

Referring to FIGS. 2 and 3, the latch assembly 12 comprises a plunger 16 supported within a housing 20, which acts as a support member. The plunger 16 extends at least partially through a plunger opening 22 within the housing 20, and rests upon a supporting surface 23 that partially defines the plunger opening 22. The plunger 16 includes a distal end 34, a lip 40, an inclined plunger ramp 38 slanting downward from the lip 40, a shoulder 24, and a rod 18. The shoulder 24 interferes with the housing 20 to prevent overextension of the plunger 16 through the plunger opening 22. The rod 18 extends through a rod opening 26 within a biasing plate 28 extending from the plunger housing 20. A spring 30 surrounds the rod 18 and extends between the shoulder 24 and the biasing plate 28 to bias the plunger 16 toward an extended position, as shown in FIG. 3. The distal end 34 of the plunger 16 is noncircular in cross-section (preferably square as shown, and interacts with the detent members 14, 15 as described herein to lock the sliding platform 6 in a plurality of positions with respect to the track 8. The opening 22 is also noncircular in cross section, and is square in the embodiment depicted. The noncircular cross sections of the plunger and the opening prevent rotation of the plunger about its axis.

Figure 4:
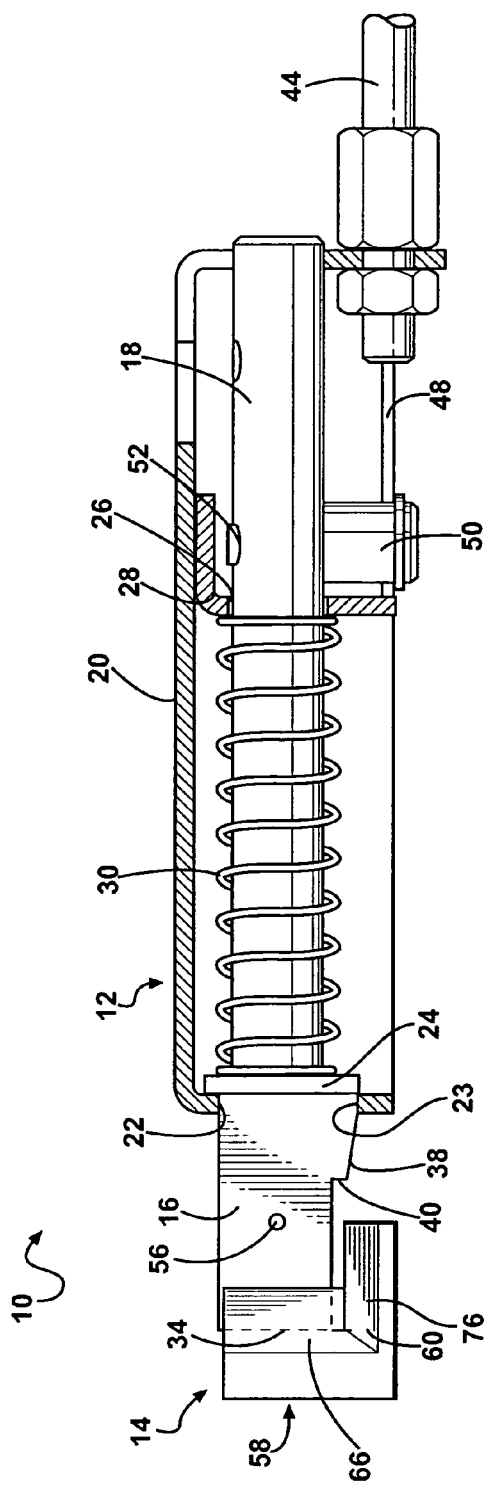
FIG. 4 is a schematic sectional side view of the latch assembly and the detent member of FIG. 2 with the latch assembly plunger in an extended position.
Figure 5:
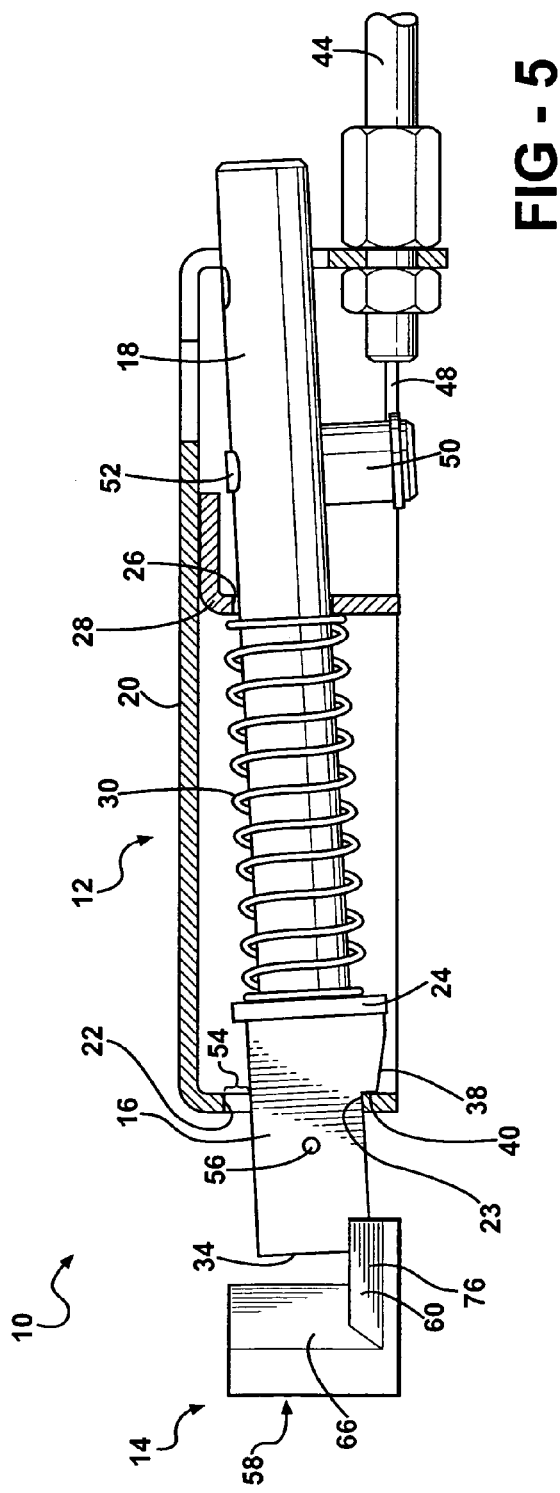
FIG. 5 is a schematic sectional side view of the latch assembly and the detent member of FIG. 2 with the latch assembly plunger in a retracted position.

Referring to FIGS. 4 and 5, wherein like reference numbers refer to like components from FIGS. 1-3, the locking mechanism 10 includes a flexible Bowden-style cable 48 movable within a sheath 44. The cable 48 is preferably operatively connected to a handle assembly, shown generally at 49 in FIG. 1. The cable 48 attaches to a post 50 extending upward toward the rod 18. A rod pin 52 extends through the rod 18 and attaches the post 50 thereto.

To retract the plunger 16, i.e., to move the plunger from the extended position shown in FIG. 4 to the retracted position shown in FIG. 5, a force is applied to the handle assembly, shown at 49 in FIG. 1. The cable 48 transmits the force from the handle assembly to the plunger 16 via the post 50, thereby compressing the spring 30 and drawing the ramp 38 and lip 40 through the opening 22. Since the cable 48 is attached to the plunger via pin 50, the vector of the force exerted by the cable is not coincident with the axis of the plunger, thereby inducing, in addition to lateral translation of the plunger, a tendency of the plunger to rotate about an axis perpendicular to the force vector. As the plunger 16 moves into the housing 20, the plunger ramp 38, being inclined, traverses the supporting surface 23 of the plunger opening 22, and as the plunger 16 tilts downward, a vertical clearance 54 is established between the plunger 16 and the housing 20 within the plunger opening 22.

The rod opening 26 is slightly larger than the rod 18, allowing the rod 18 to pivot about the rod opening 26 as the plunger 16 rotates. The plunger 16 continues movement into the housing 20 until the lip 40 on the plunger 16 drops into the housing 20 such that the plunger 16 reaches the retracted position shown in FIG. 5. In the retracted position, the vertical clearance 54 is maximized. A plunger pin 56 extending through the plunger 16 prevents overretraction of the plunger 16 into the housing 20 by interfering with the housing 20. Movement of the plunger 16 into the housing compresses the spring 30 between the shoulder 24 and the biasing plate 28. The lip 40 on the plunger 16 interferes with the plunger housing 20, preventing the spring 30 from urging the plunger 16 back out of the housing 20 and into the extended position.

It should be appreciated that the detent members 14, 15 are substantially identical, such that description of detent member 14 suffices as a description of detent member 15. Referring again to FIGS. 2 and 3, the detent member 14 comprises a locking portion 58 and two resetting portions 60. The detent member 14 may be comprised of one or more pieces within the scope of the claimed invention. The locking portion 58 defines a locking slot 64 for receiving the distal end 34 of the plunger 16. The locking slot 64 is substantially the same width as the distal end 34 of the plunger 16 to sufficiently lock the plunger 16 within the locking slot 64 as described herein. A pair of locking ramps 66 define the locking slot 64 therebetween. Each of the resetting portions 60 includes an inner resetting ramp 72 extending upward from a clearance slot 70 to a top face 74, and an outer ramp 76 sloping downward away from the top face 74.

In operation, the plunger 16 is retracted as described above, freeing the sliding platform 6 to move along the track 8. When the plunger 16 is fully retracted, the distal end 34 rests within the clearance slot 70 between the resetting ramps 72. Since the clearance slot 70 is wider than the locking slot 64, and thus wider than the distal end 34 of the plunger 16, the plunger 16 will not contact the detent member 14 during initial load floor movement. Thus the latch assembly 12 initially moves, with the sliding platform 6 to which it is attached, within the clearance slot 70 to a position where the plunger 16, even if released, will not reengage the locking slot 64 due to interference with one of the ramps 66.

As the latch assembly 12 continues movement with respect to the detent member 14, the plunger 16 contacts the inner resetting ramp 72 of one of the resetting portions 60. Relative movement of the plunger and the ramp 72 will cause the plunger to rotate, thereby disengaging the lip 40 from the housing 20 and allowing the spring 30 to force the plunger 16 out of the housing 20 toward the locking slot 64. As the plunger 16 extends, the plunger ramp 38 acts against the plunger opening 22 to increase rotation of the plunger 16. One of the locking ramps 66 initially pushes against the plunger 16, disallowing full extension thereof. However, once the plunger 16 clears the locking ramp as the load floor is moved, full extension is realized, and the plunger 16 reaches the extended position shown in FIG. 4.

To relock the locking mechanism 10, the sliding platform 6 moves along the track 8, thereby moving the latch assembly 12 toward one of the detent members 14, 15. For ease of description, it will be assumed that the sliding platform 6 moves the latch assembly 12 toward detent member 15 to lock the sliding platform 6 in a different position. However, it should be appreciated that the sliding platform 6 could also move back toward detent member 14 without changing operation of the invention. The plunger 16 contacts one of the locking ramps 66 of detent member 15, which pushes the plunger 16 back into the housing 20, thereby compressing the spring 30. The locking ramp 66 is designed so as not to push the plunger 16 fully into the retracted position. Instead, the plunger 16 slides along the locking ramp 66 to store potential energy within the spring 30. When the plunger 16 reaches the locking slot 64, the potential energy stored within the spring 30 pushes the plunger 16 into the locking slot 64 to lock the sliding platform 6 in position.

In the preferred embodiment, three detent members 14, 15, 15' are included to lock the load floor in three positions: stowed, mid-extension and full extension. Each detent member 14, 15, 15' works as described herein. The locking ramps 66 are identical, such that relocking is facilitated from either direction. Additionally, it should be appreciated that a plurality of latch assemblies 12 may be utilized in conjunction with a single detent member 14 without changing the inventive concept. However, since the detent members 14, 15, 15' have fewer parts and cost less than the latch assembly 12, this is not the preferred method of practicing the invention.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

What is claimed is:

1. A locking mechanism comprising:
   a support member defining an opening;
   a plunger extending through said opening, said plunger being selectively movable between an extended position, in which said plunger protrudes a first distance from said opening, and a retracted position, in which said plunger protrudes a second distance from said opening, said second distance being less than said first distance;
   a lip disposed on said plunger for engaging said support member to retain said plunger in said retracted position;
   a detent member having first and second resetting portions, each being configured to disengage said lip from said support member, thereby allowing said plunger to move to said extended position; and
   a spring biasing said plunger toward said extended position, said spring causing said plunger to move from said retracted position to said extended position when said lip is disengaged from said support member;
   wherein said detent member defines a slot with which the plunger is engageable when in the extended position;
   wherein said detent member further includes at least one ramp engageable with said plunger when said plunger is in said extended position to urge said plunger toward said retracted position, thereby compressing said spring to store energy therein; and
   wherein energy stored within said spring forces said plunger into said slot when said plunger aligns with said slot.

2. The locking mechanism of claim 1, wherein said plunger further includes a stop member configured to prevent overretraction of said plunger.

3. The locking mechanism of claim 2, wherein said plunger further includes a shoulder portion configured to prevent overextension of said plunger.

4. The locking mechanism of claim 3, wherein the end of said plunger proximate to said detent member has a substantially square cross section.

5. An apparatus comprising:
   a first member;
   a second member movable with respect to said first member between a first position and a second position;
   a latch assembly including a support member defining an opening and a plunger extending through said opening, said support member including a support surface for supporting said plunger and partially defining said opening; and
   first and second detent members, said latch assembly engageable with said first detent member to secure said second member in said first position, and engageable with said second detent member to secure said second member in said second position;
   said plunger having a lip and being selectively movable between a retracted position, wherein said lip engages said support member to retain said plunger in said retracted position, and an extended position, wherein said plunger is configured to engage one of said first and second detent members.

6. The apparatus of claim 5 further comprising a spring biasing said plunger toward said extended position.

7. The apparatus of claim 6 wherein said first and second detent members include a geometric feature configured to contact said plunger during movement of said second member from said first position to said second position to disengage said lip, thereby allowing said spring to bias said plunger into said extended position.

8. The apparatus of claim 7 wherein said plunger rotates during movement between said retracted position and said extended position.

9. The apparatus of claim 6 wherein said first and second detent members include a locking ramp engageable with said plunger when said plunger is in said extended position to push said plunger toward said retracted position, thereby compressing said spring to store energy therein.

10. The apparatus of claim 9 wherein said detent members further include a locking slot, and wherein energy stored within said spring pushes said plunger into said locking slot when said plunger aligns with said locking slot.

11. The apparatus of claim 5 wherein said plunger further includes a stop to prevent overretraction of said plunger by interfering with said support member.

12. The apparatus of claim 5 wherein said plunger further includes a shoulder to prevent overextension of said plunger by interfering with said support member.

* * * * *